B. A. SWASEY.
ANIMAL TRAP.
APPLICATION FILED AUG. 31, 1908.
912,203.
Patented Feb. 9, 1909.
2 SHEETS—SHEET 1.
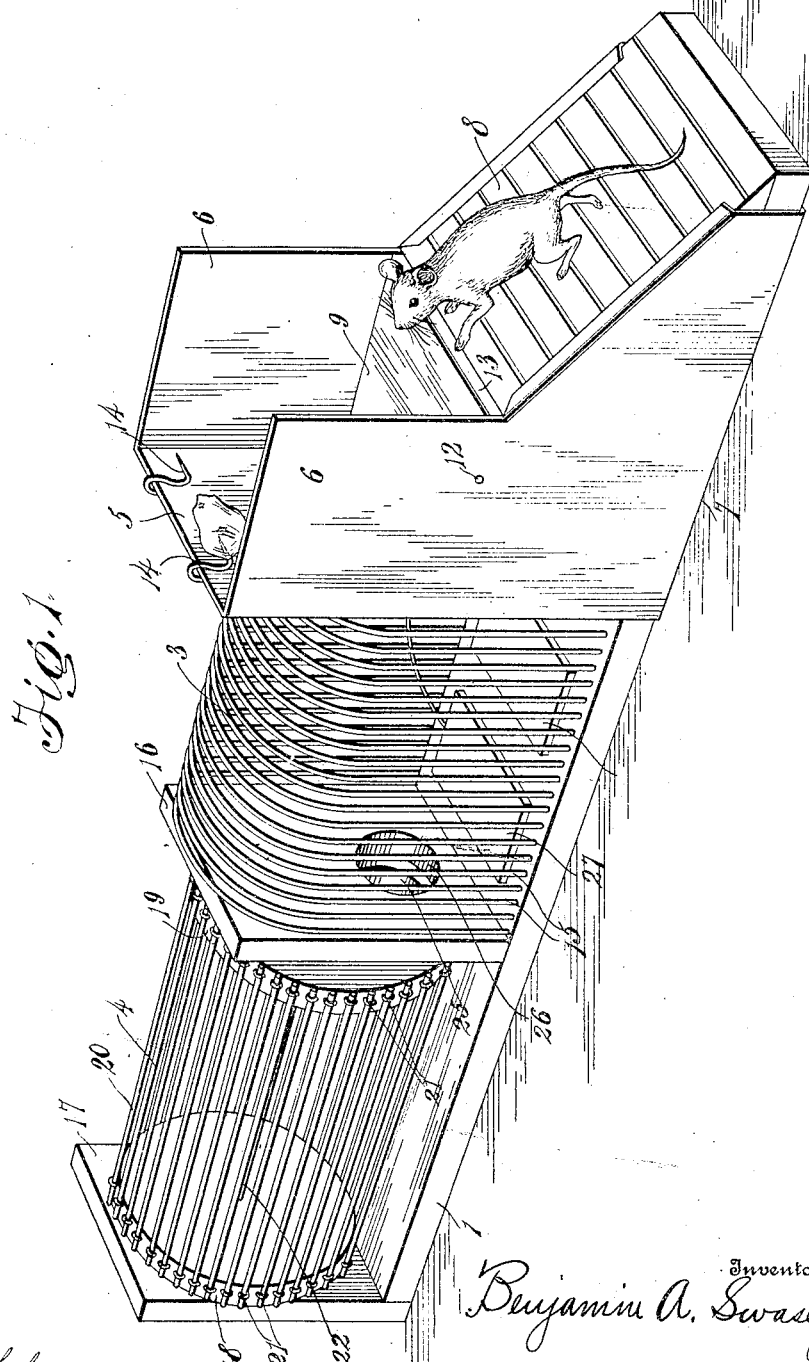
Witnesses
Rose S. Johnson
J. M. Perry
Inventor
Benjamin A. Swasey
By Watson E. Coleman
Attorney

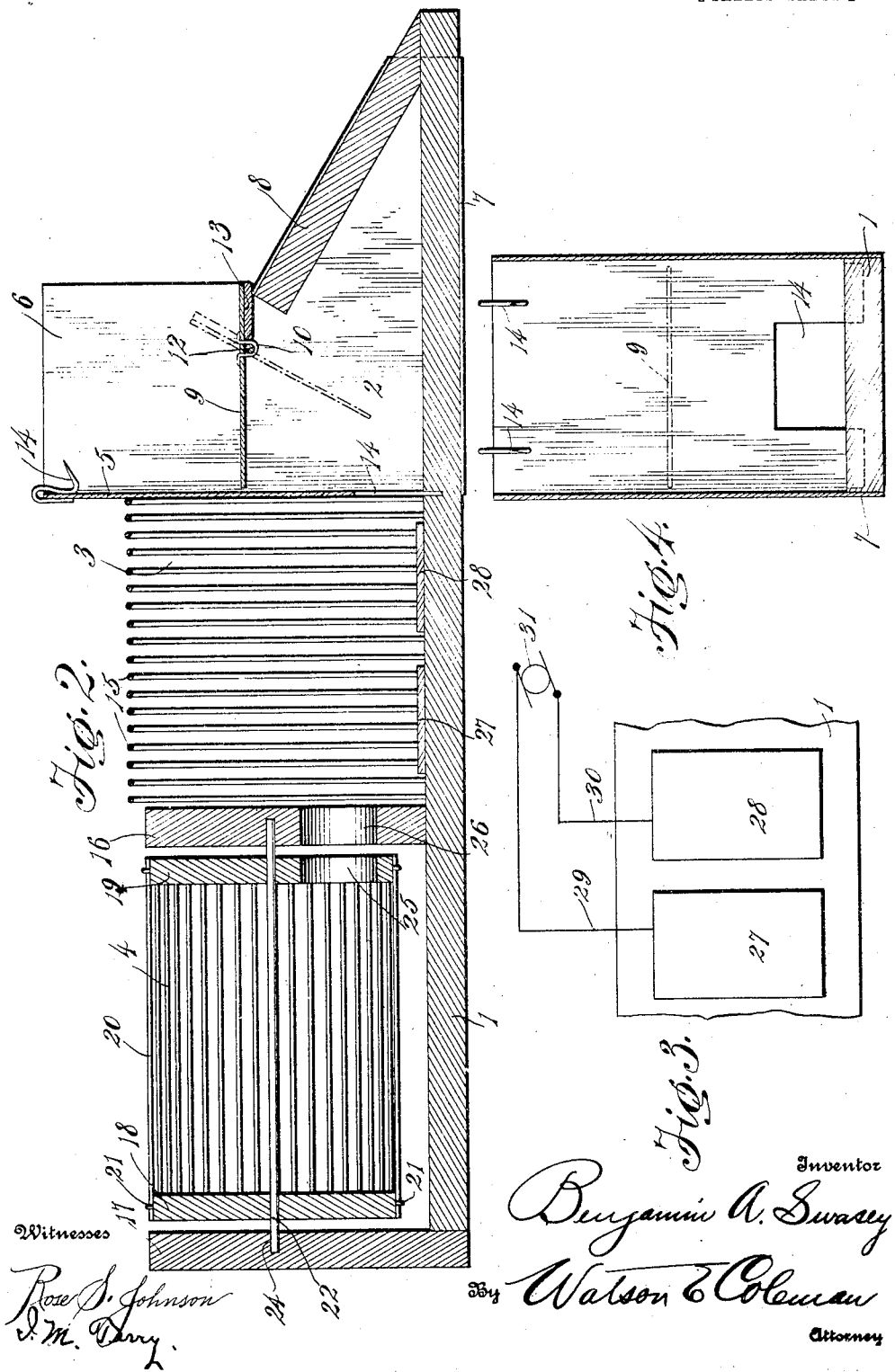

UNITED STATES PATENT OFFICE.

BENJAMIN A. SWASEY, OF WEST PERU, MAINE, ASSIGNOR TO RALPH A. WORTH, OF PORTLAND, MAINE.

ANIMAL-TRAP.

No. 912,203.  Specification of Letters Patent.  Patented Feb. 9, 1909.

Application filed August 31, 1908. Serial No. 450,875.

*To all whom it may concern:*

Be it known that I, BENJAMIN A. SWASEY, a citizen of the United States, residing at West Peru, in the county of Oxford and State of Maine, have invented certain new and useful Improvements in Animal-Traps, of which the following is a specification, reference being had to the accompanying drawings.

This invention relates to improvements in animal traps and consists of the novel features of construction and the combination and arrangement of parts hereinafter fully described and claimed.

The object of the invention is to provide an animal trap of this character which will be simple, strong, durable and comparatively inexpensive to produce and which will be effective in operation.

The above and other objects of the invention, as will hereinafter more fully appear, are attained in its preferred embodiment illustrated in the accompanying drawings, in which—

Figure 1 is a perspective view of the trap; Fig. 2 is a vertical longitudinal section; Fig. 3 is a detail plan view of the floor of the inner compartment or cage of the trap and showing the electrical connections for the contact plates; and Fig. 4 is a vertical transverse section through the outer or front compartment of the trap.

The trap comprises a base board 1 on which is mounted a front or outer compartment 2, an inner or rear compartment 3 and a rotary cage 4. The outer compartment 2 is formed upon the front end of the base 1 by means of a piece of sheet metal which is bent to form an inner vertical wall 5 and two similar side walls 6, the lower edges of the latter being secured at 7 to the side edges of the base 1 and the upper front corners of the same being cut away, as shown, for the reception of an upwardly inclined platform 8 which serves as an approach to the top of the compartment 2 and which is in the form of a board arranged in a downwardly inclined position to form a front or outer wall for the compartment. The open top of the latter is closed by a downwardly tilting trap door 9 in the form of a rectangular metal plate arranged between the walls 5, 6 and fixed by means of U-shaped metal fastenings 10 to a transverse pivot rod 12. The latter has its ends rotatably mounted in bearing openings in the side walls 6 and it is arranged some distance in from the outer or front edge of the plate 9 upon which is secured a suitable weight 13 which serves to maintain the trap door normally in its horizontal or closed position shown in full lines in Fig. 2. When an animal ascends the inclined approach 8 to reach the bait upon one or more bait hooks 14 arranged upon the top of the vertical wall 5, he must step upon the tilting platform or trap door 9 and will be dropped by the latter into the compartment 2. The platform tilts to its inclined dotted line position in Fig. 2 to drop the animal and it turns by gravity to its horizontal position to prevent the escape of the animal. The compartment 2 communicates with the inner compartment or cage 3 through a door opening 14 formed in the lower portion of the vertical wall 5. Said compartment 3 is composed of a plurality of suitably united and inverted U-shaped wires 15 arranged in parallel relation above the intermediate portion of the base board 1 and having their lower ends set in the latter. Said wires 15 extend from the wall 5 to a transverse upright wall 16 which forms one of the supports for the rotary cage 4. The other support for said cage is in the form of a similar transverse wall 17 arranged at the rear end of the base board 1.

The cage 4 is in the form of an open rotary cylindrical body consisting of two circular heads 18, 19 united by spaced parallel wires 20 the ends of which latter are secured by staples 21 to the edges of the heads 18, 19. A pivot rod or shaft 22 extends concentrically through said heads and has its ends rotatably mounted in bearing recesses 24 formed in the upright walls 16, 17. In the front head 19 is formed a circular opening 25 adapted to move into register with an opening 26 formed in a lower portion of the wall or upright 16 so that an animal in the compartment or cage 3 may pass through the openings 26, 25 and into the rotary cage 4, which latter will rotate as the animal moves around in the same.

If desired, the animals entering the compartment or cage 3 of the trap may be electrocuted by providing upon the floor or bottom of said compartment two spaced contact plates 27, 28 which are connected by electrical conductors 29, 30 to a suitable source of electricity indicated diagrammatically at 31 in Fig. 3. It will be seen that when the animal passes into the compartment 3 and steps from the plate 28 to the plate 27 the circuit through said plates will be completed.

From the foregoing description taken in connection with the accompanying drawings, it is thought that the construction, operation and advantages of the invention will be readily understood without a more detailed explanation.

Having thus described the invention what is claimed is:

An animal trap comprising a base, a metal plate bent to provide side walls and a transverse connecting wall, the latter having an opening, said plate being vertically disposed and secured adjacent to one end of the base, an inclined platform arranged between said side walls, said plate and platform forming a front compartment, a downwardly and inwardly tilting trap door for the top of said compartment, bait supporting means arranged above the trap door, and means upon the base in rear of the transverse connecting wall to provide a second compartment, the latter being in communication with the front compartment through the opening formed in said transverse connecting wall.

In testimony whereof I hereunto affix my signature in the presence of two witnesses.

BENJAMIN A. SWASEY.

Witnesses:
R. A. WORTH,
PHILIP A. DREW.